United States Patent [19]
Girard et al.

[11] Patent Number: 5,748,409
[45] Date of Patent: May 5, 1998

[54] WELDING STRESS ISOLATION STRUCTURE FOR HEAD SUSPENSION ASSEMBLIES

[75] Inventors: Mark T. Girard; Jeffry S. Bennin; David A. Ziegler, all of Hutchinson, Minn.

[73] Assignee: Hutchinson Technology Incorporated, Hutchinson, Minn.

[21] Appl. No.: 821,709

[22] Filed: Mar. 19, 1997

Related U.S. Application Data

[63] Continuation of Ser. No. 400,851, Mar. 8, 1995, abandoned.

[51] Int. Cl.$^6$ ............................................. G11B 5/48
[52] U.S. Cl. ............................................. 360/104
[58] Field of Search .................. 360/97.01, 98.01, 360/104–106; 219/121.13, 121.14, 121.45, 121.46, 121.61–121.64, 125.1, 136, 137 R

[56] References Cited

U.S. PATENT DOCUMENTS

| | | | |
|---|---|---|---|
| 4,786,999 | 11/1988 | Tanaka et al. | 360/104 |
| 5,109,175 | 4/1992 | Albert | 310/321 |
| 5,201,458 | 4/1993 | Hagen | 360/104 |
| 5,271,597 | 12/1993 | Jerman | 251/11 |
| 5,277,611 | 1/1994 | Berek et al. | 439/325 |
| 5,282,102 | 1/1994 | Christianson | 360/104 |
| 5,287,744 | 2/1994 | Norling et al. | 73/497 |
| 5,291,359 | 3/1994 | Wolter | 360/104 |
| 5,408,372 | 4/1995 | Karam, II | 360/104 |

*Primary Examiner*—Jefferson Evans
*Attorney, Agent, or Firm*—Faegre & Benson LLP

[57] ABSTRACT

In a suspension assembly for a disk drive, a welding isolation structure for creating an isolated weld point and for substantially eliminating undesirable propagation of welding stresses during the welding of elements of the suspension assembly. The welding isolation structure is placed on selected locations on suspension assembly elements. The isolation structure includes a welding area, at least one isolation slot including a through aperture delineating at least a portion of the perimeter of the welding area, and at least one junction tab bridging the isolation slot and connecting the welding area to the remainder of the load beam. The isolation slots are designed to substantially relieve and contain welding stresses. In the suspension assembly, the tabs of each weld point are oriented generally in directions other than towards other weld points, such that additive and uneven propagation of welding stresses is prevented. The tabs can include curves, such as S-shapes, to attenuate propagation of remaining welding stresses. Additional isolation slots can be placed adjacent and generally opposite the junction tabs from the welding area to further relieve remaining welding stresses.

32 Claims, 7 Drawing Sheets

WELDING STRESS ISOLATION STRUCTURE FOR HEAD SUSPENSION ASSEMBLIES

This application is a continuation of Ser. No. 08/400,851 filed Mar. 8, 1995, now abandoned.

FIELD OF THE INVENTION

The present invention relates to head suspension assemblies (HSAs) for data storage disk drives. In particular, the present invention is a welding stress isolation structure for creating an isolated weld point, to substantially eliminate undesirable propagation of welding stresses caused by expansion and contraction of material heated during welding of elements of an HSA.

BACKGROUND OF THE INVENTION

HSAs are the components in a disk drive that position a read/write head assembly over the spinning surface of a data storage device (e.g. a magnetic hard disk). HSAs are some of the smallest and most delicate components of a rigid disk drive. An HSA includes a suspension assembly and a head assembly. The head assembly is positioned at a distal end of the suspension assembly. The suspension assembly is an elongated spring structure. Suspension assemblies act in a similar fashion to the needle arm in a record player, positioning the head assembly nanometers from the surface of a spinning disk in the disk drive. Typical suspension assemblies measure less than 20 mm long and are 0.03 to 0.1 mm thick. Suspension assemblies generally include elements such as an elongated load beam, a gimbal flexure located at a distal end of the load beam, and a base plate or other mounting means located at a proximal end of the load beam.

The head assembly is mounted to the gimbal flexure. The gimbal flexure provides gimballing support to the head assembly. The head assembly includes an air bearing slider and a read/write magnetic transducer formed on the slider. The slider is a head assembly element aerodynamically shaped to use the air stream generated by the spinning disk to produce a lift force which supports the head assembly above the disk.

During operation of the disk drive; the whole suspension assembly is designed to work together to maintain the head assembly at a desired orientation with respect to the surface of the disk. The orientation or attitude of the head assembly and of the HSA is defined by a pitch axis angle measurement and a roll axis angle measurement (pitch angle and roll angle) measured in relation to a manufacturing datum plane. The manufacturing datum plane is a horizontal plane representing a suspension mounting surface of an actuator. The pitch and the roll axes are parallel to the horizontal plane and are mutually perpendicular, intersecting at a point on the head bonding platform. The roll axis is usually aligned with the longitudinal axis of the suspension assembly. Roll errors are undesired changes in the roll angle. Pitch errors are defined as undesired changes in the pitch angle.

A design goal for magnetic disk drives is to "fly" the head at the closest possible distance and at a desired attitude with respect to the surface of the disk, since the size of the magnetic field "spot" written and read by the transducer is directly proportional to the square of the distance between the transducer and the disk. Small changes in distance and/or attitude can cause the head assembly to "crash", that is, to hit the surface of the spinning disk. A crash can destroy both the transducer and any data recorded on the surface of the disk.

Elements of a suspension assembly, such as the load beam and the gimbal flexure, are often attached together by welds.

During welding, intense heat is applied to weld points on the surface of the elements to be welded. A zone of expanded molten material joining the two elements is created. The zone is then allowed to cool down. Since the zone loses heat to the outside atmosphere and to the surrounding material, the zone cools from the outside in, contracting as it cools. Once the zone has cooled, the solidified material holds the suspension assembly elements together.

The rapid heating and cooling creates welding stresses as the heated material expands and contracts due to its positive coefficient of thermal expansion, and therefore pushes and pulls the surrounding material. Even a single weld point located in a symmetrical position on the suspension assembly (where forces can be spread in a symmetrical pattern over relatively large surfaces and are therefore diminished), can cause welding stresses that can warp or deform suspension assembly elements.

Yet, in certain circumstances, such as when weld points are close together or when the geometry of a suspension assembly element impedes even distribution of welding stresses, welding stresses can unevenly propagate and can undesirably add upon each other. Since the material surrounding a pre-existing weld point is fixed, welding stresses from a new nearby weld point will tend to unevenly propagate and concentrate in a direction opposite and away from the pre-existing weld point. The intensified uneven stresses, added to existing stresses from the pre-existing weld, can lead to warping or curling of the suspension assembly element.

Such uncontrolled stresses and subsequent deformation can affect the pitch and roll angles of the HSA. Given the precision required from HSAs, even a small variation in the pitch or roll angle of an HSA element can render the HSA defective by making it prone to crashes or by affecting the size and accuracy of the magnetic field read/write spot. Defective HSAs can compromise the reliability of the whole disk drive and destroy both the disk and its data.

SUMMARY OF THE INVENTION

The present invention is a welding stress isolation structure for creating an isolated weld point on a suspension assembly element. The welding stress isolation structure is designed to substantially eliminate deformation of the suspension assembly element caused by undesirable propagation of welding stresses.

The isolation structure includes a welding area, at least one slot delineating the perimeter of the welding area, and a junction tab. The welding area is a generally flat metal surface located on a selected location on the suspension assembly element. The welding area has a perimeter delineated or defined by at least one isolation slot. The isolation slot is a through aperture on the suspension assembly element. The slots help relieve and redirect the welding stresses. The junction tab is a generally rigid piece of material supporting the welding area and connecting the welding area to the remainder of the suspension assembly element opposite the isolation slot from the welding area.

In a preferred embodiment, the isolation structure has a generally circular welding area delineated by two isolation slots, through holes shaped as generally circumferential or semicircular arcs. The slots are separated by two junction tabs connecting opposite ends of the welding area to the remainder of the suspension assembly element.

To reduce propagation of welding stresses through the junction tabs, some embodiments of the isolation structure include irregularly shaped junction tabs, some of the tabs having stress relieving curves. One such embodiment includes a generally S-shaped junction tab, that is, a junction tab having two connecting opposite radial curves.

Another embodiment of the welding stress isolation structure includes a generally rigid junction tab having a first segment and a second segment. The first segment includes a generally straight portion of material connected to the welding area and extending generally in a radial direction away from the welding area. The second segment is a curved portion connected at one end to the first segment and at another end to the remainder of the suspension assembly element. The second segment can be shaped as a generally planar elliptical curve having a 180 degree radial break.

Another embodiment of an isolation structure reduces propagation of welding stresses through the junction tabs by placing additional slots through the suspension assembly element adjacent and generally opposite the tab from the welding area. The slots are radially spaced from the welding area and include through apertures shaped as arc segments.

A preferred embodiment of a suspension assembly in accordance to the present invention includes a gimbal assembly attached to a load beam by four weld points. Each weld point is located within and isolated by a welding stress isolation structure etched on the load beam.

Each isolation structure has two junction tabs aligned on opposite ends of a welding area, the tabs separating two generally semicircular isolation slots. A first and a second isolation structure are placed on a roll axis of the suspension assembly and have their respective junction tabs aligned with a pitch axis.

A third and a fourth isolation structure are placed adjacent to each other and on opposite sides of the roll axis, in between, but not contiguous to, the first and second isolation structures. The junction tabs of the third and fourth isolation structures are aligned with the roll axis and oriented to prevent propagation of welding stresses in the direction of other isolation structures. The location and orientation of the stress isolation structures is intended to minimize additive or uneven welding stresses in a suspension assembly element. In other embodiments, stress isolation structures of different shapes can be located on selected locations on the load beam, the gimbal flexure, or both the gimbal flexure and the load beam.

DETAILED DESCRIPTION OF THE PREFERRED EMBODIMENTS

The present invention is a welding stress isolation structure for substantially reducing the undesired propagation of welding stresses caused by expansion and contraction of material in and surrounding a weld point during welding of elements of an HSA. The stress isolation structure helps to prevent pitch and roll angle deviations (pitch and roll errors) caused when welding stresses deform suspension assembly elements.

Welding stress isolation structures in accordance with the present invention can be used to isolate weld points in a variety of suspension arm elements. Suspension arm elements are elements of a disk drive included in or connected to the HSA, such as a base plate, a combined base plate arm, an actuator, a gimbal flexure, a spring region, or a support structure. The stress isolation structures can be placed on either or both of the suspension arm elements to be welded together.

Figure 1:
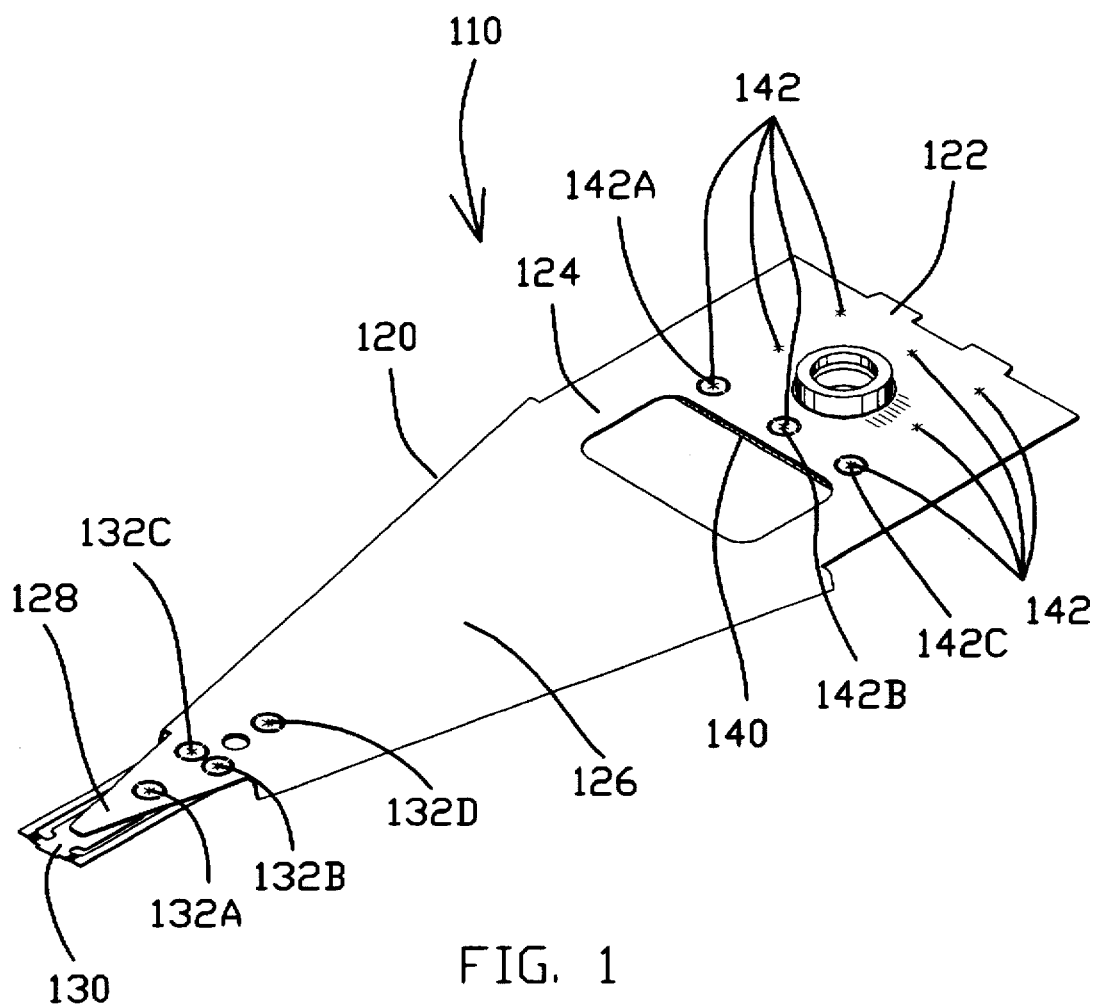
FIG. 1 is an isometric top view of a suspension assembly having suspension assembly elements bonded by several weld points, wherein some of the weld points are isolated by welding stress isolation structures in accordance with the present invention.

FIG. 1 illustrates a suspension assembly 110 having a load beam 120, a gimbal flexure 130, and a base plate 140. Load beam 120 is an elongated planar metal spring element. Load beam 120 includes a base plate region 122 at a proximal end; a spring region 124 adjacent the base plate region 122, a rigid region 126 adjacent the spring region 124, and a gimbal attachment region 128 at a distal end.

Gimbal flexure 130 is attached to the gimbal attachment region 128 by four weld points 132A–132D. The term weld point is used to refer to the welded spot joining elements of an HSA. In the embodiment shown, base plate 140 is attached to the base plate region 122 by eight weld points 142A–142C and 142.

Gimbal flexure 130 is a spring structure to which a head assembly (not shown) is attached. The gimbal flexure 130 provides gimballing support to the head assembly and holds the head at a predetermined orientation with respect to the surface of a spinning disk. Base plate 140 is a metal support structure congruent to the base plate region 122.

Figure 2:
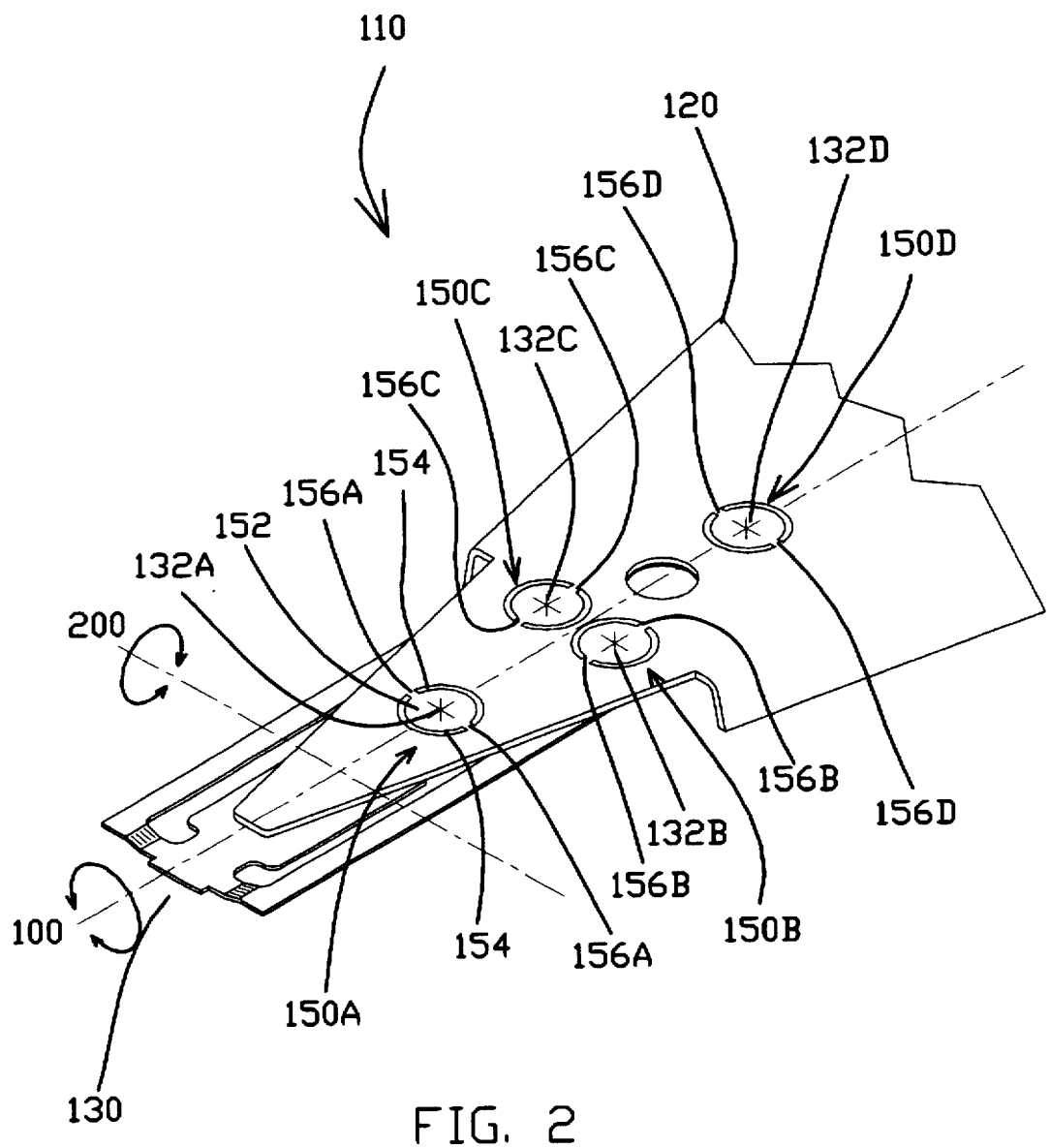
FIG. 2 is a detailed isometric top view of a distal end of the suspension assembly illustrated in FIG. 1, including a first embodiment of welding stress isolation structures in accordance with the present invention located on the load beam.

FIG. 2 is a detailed isometric top view of a distal end of the suspension assembly 110 shown in FIG. 1. Suspension assembly 110 has four welding stress isolation structures 150A–150D in accordance with the present invention, each one surrounding a respective weld point 132A–132D.

Load beam 120 is attached to gimbal flexure 130 by weld points 132A–132D. Each weld point 132A–132D is located in the middle of a respective welding stress isolation structure 150A–150D. Since stress isolation structures 150A–150D are all similar to each other, the description of the elements of stress isolation structure 150A equally applies to stress isolation structures 150B–150D.

Stress isolation structure 150A includes a welding area 152, generally a flat portion of the load beam 120. The welding area 152 is generally shaped as a circle having a diameter of 1 mm. The welding area has a perimeter delineated by two isolation slots 154. Isolation slots are holes or apertures through the suspension assembly element placed in close proximity to the weld point to reduce the propagation of stresses from the weld point to the remainder of the suspension assembly element. In the embodiment shown in FIG. 2, slots 154 are generally shaped as semicircular arc segments having a radial width of 0.25 mm and defining the perimeter or circumference of the welding area 152. Since different suspension assembly designs and welding patterns have different support requirements, the slots of different embodiments can have different shapes and dimensions.

Two junction tabs 156A separate the ends of the two slots 154 from each other, support the welding area 152, and connect the welding area 152 to the remaining portions of the load beam 120 across the isolation slot (opposite the isolation slot from the welding area). A first end of each junction tab 156A is connected to the welding area 152. A second end is connected to the rest of the load beam 120. The two junction tabs 156 function as rigid bridges positioned at opposite ends of the welding area 152. In the embodiment shown in FIG. 2, the junction tabs 156A–156D have a width of 0.25 mm.

The size of the welding area, the proximity and shape of the slots, the placement, design, and dimensions of the junction tabs all can vary depending on the needs (such as time and temperature of welding, required mechanical support, materials used, weld strength, positioning of other weld points, and expected propagation of weld stresses) of each suspension assembly. Other embodiments can include a different number of slots or differently shaped slots.

A preferred method for manufacturing the stress isolation structures 150A is to etch the slots 154 while etching other features of the load beam 120. The stress isolation structure 150A can also be stamped, electrically discharged machined, or manufactured by other methods known in the art. Similar stress isolation structures can be provided at aligned locations on the gimbal flexure 130.

During welding, intense heat is applied to the weld point 132A (a preferred method is for the operator to aim laser light beam pulses having an intensity between 80 watts to 140 watts for one to five milliseconds at the weld point 132A). Due to the positive thermal coefficient of expansion of metal load beam elements, the weld point 132A and the surrounding welding area 152 tend to expand when heated. The opening or void provided by slots 154 provides the welding area 152 an expansion buffer zone and allows the welding area 152 to expand and welding stresses to dissipate without affecting surrounding material. The slots 154 relieve and contain the expansion forces in a limited area. Conversely, when the welding area 152 cools (usually in less than two milliseconds) and contracts, pulling in surrounding material, the slots 154 contain the transmission of the contraction forces. Containment of thermal expansion and contraction forces, and therefore of welding stresses, substantially eliminates deformation and pitch and roll errors caused by the welding process.

To prevent or minimize the transmission of welding stresses through junction tabs 156A–156D, isolation structures 150A–150D of suspension assembly 110 are located and oriented so as to minimize additive or uneven welding stresses. Orientation of a stress isolation structure is generally defined as the direction of an axis extending from the weld point through the second end of the junction tabs of the isolation structure. Welding stresses propagate outwardly from the weld spot along a radial vector. Since remaining welding stresses (stresses not absorbed by the isolation structure) can be propagated by the physical connection between the welding area and the remaining portion of the suspension assembly element provided by the junction tabs the orientation of an isolation structure is also the general direction any remaining welding stresses are expected to propagate.

Isolation structures 150A and 150D of FIG. 2 are located on a roll axis 100. The roll axis 100 is co-linear with a longitudinal center axis of the suspension assembly 110. Both isolation structures 150A and 150D have junction tabs 156A and 156D aligned with a pitch axis 200. The pitch axis 200 is orthogonal to the roll axis 100. The roll axis 100 and the pitch axis 200 intersect at a point on the head bonding platform of the gimbal flexure 130.

The likelihood that welding stresses will deform a suspension assembly element and affect the pitch or roll angle of the suspension assembly element generally depends on the magnitude and direction of the welding stresses. Uneven welding stresses propagating along the roll axis 100 are more likely to cause pitch errors. Uneven welding stresses traveling perpendicularly to the roll axis 100 are more likely to cause roll errors. Attenuated, non-additive stresses and stresses that are evenly distributed across relatively large areas are less likely to cause either pitch or roll errors.

Placement of the isolation structures 150A and 150D on the roll axis 100 reduces pitch angle errors by allowing even propagation of remaining welding stresses across the entire width of symmetrical halves of the suspension assembly 110. Additionally, placement of the junction tabs 156A and 156D perpendicular to the roll axis 100, and orientation of the tabs 156A and 156D in a direction other than in the direction of other welds or areas of fixed material, substantially reduces or minimizes undesirable propagation and addition of remaining welding stresses along the roll axis 100, thereby reducing pitch errors.

Isolation structures 150B and 150C are positioned side-by-side on either side of the roll axis 100 and have junction tabs 156B and 156C aligned parallel to the roll axis 100. The placement and orientation of the isolation structures 150B and 150C allow even propagation of remaining welding stresses in a longitudinal direction and distributed along the entire length of the suspension assembly 110, thereby reducing the possibility of roll errors.

Figure 3:
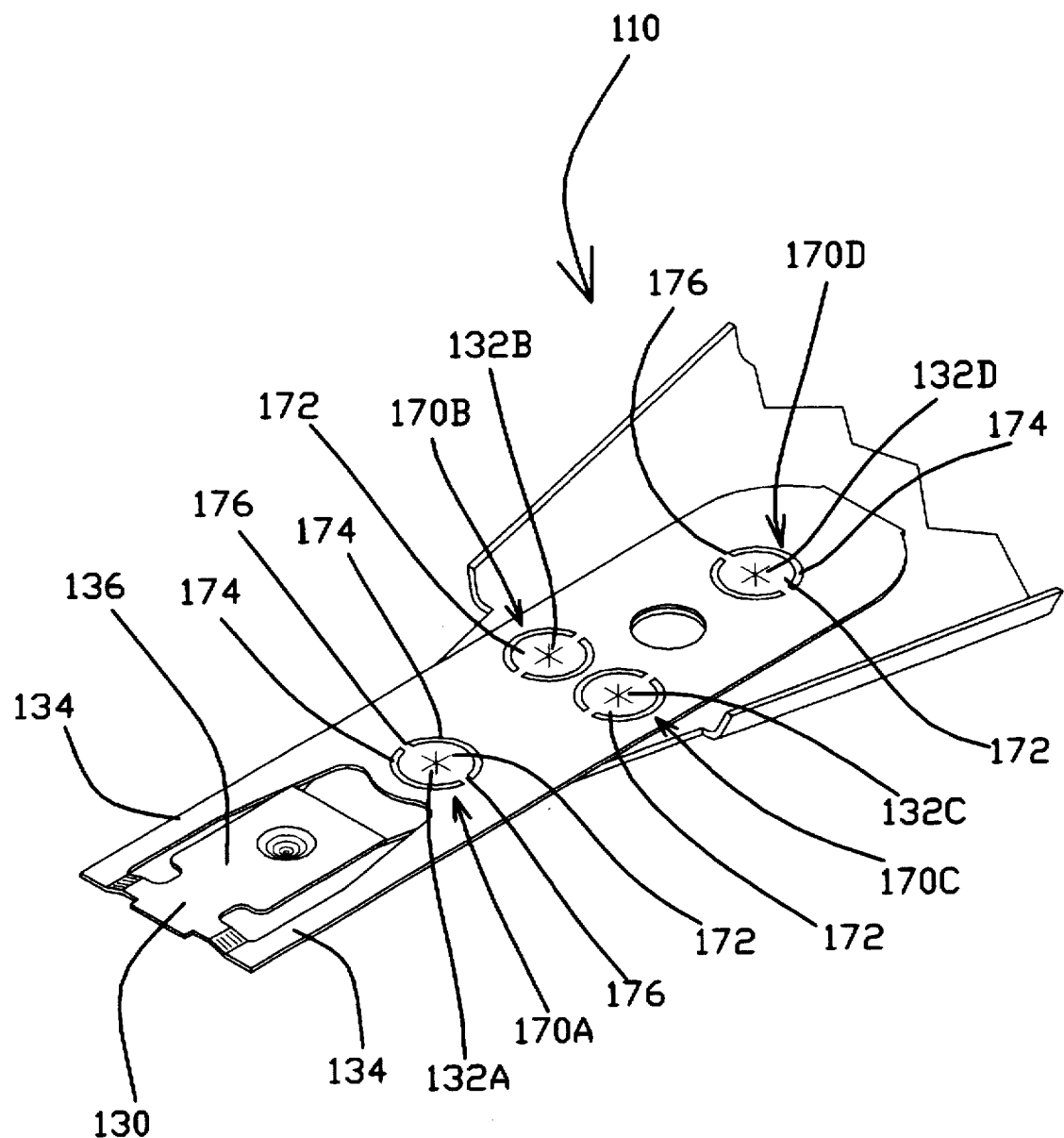
FIG. 3 is a detailed isometric bottom view of the distal end of the suspension assembly illustrated in FIG. 1, including welding stress isolation structures in accordance with the present invention located on the gimbal flexure.

FIG. 3 is a detailed isometric bottom view of the distal end of the suspension assembly 110, including gimbal flexure 130. The gimbal flexure 130 includes a gimballing spring structure including spring arms 134 and a planar head bonding platform 136 for attachment of the head assembly, the spring arms 134 supporting the head bonding platform 136.

Gimbal flexure 130 includes four welding stress isolation structures 170A–170D, surrounding the weld points 132A–132D respectively. Other embodiments of suspension assemblies can have welding stress isolation structures only on the gimbal flexure or only on the load beam. Isolation structures 170A–170D have similar elements, a similar orientation, and are aligned opposite to welding structures 150A–150D. Each isolation structure 170A–170D has a welding area 172, a flat portion of the surface of the gimbal flexure 130. Each welding area 172 is delineated and defined by two semicircular isolation slots 174. Two junction tabs 176 separate the respective two slots 174.

Figure 4:
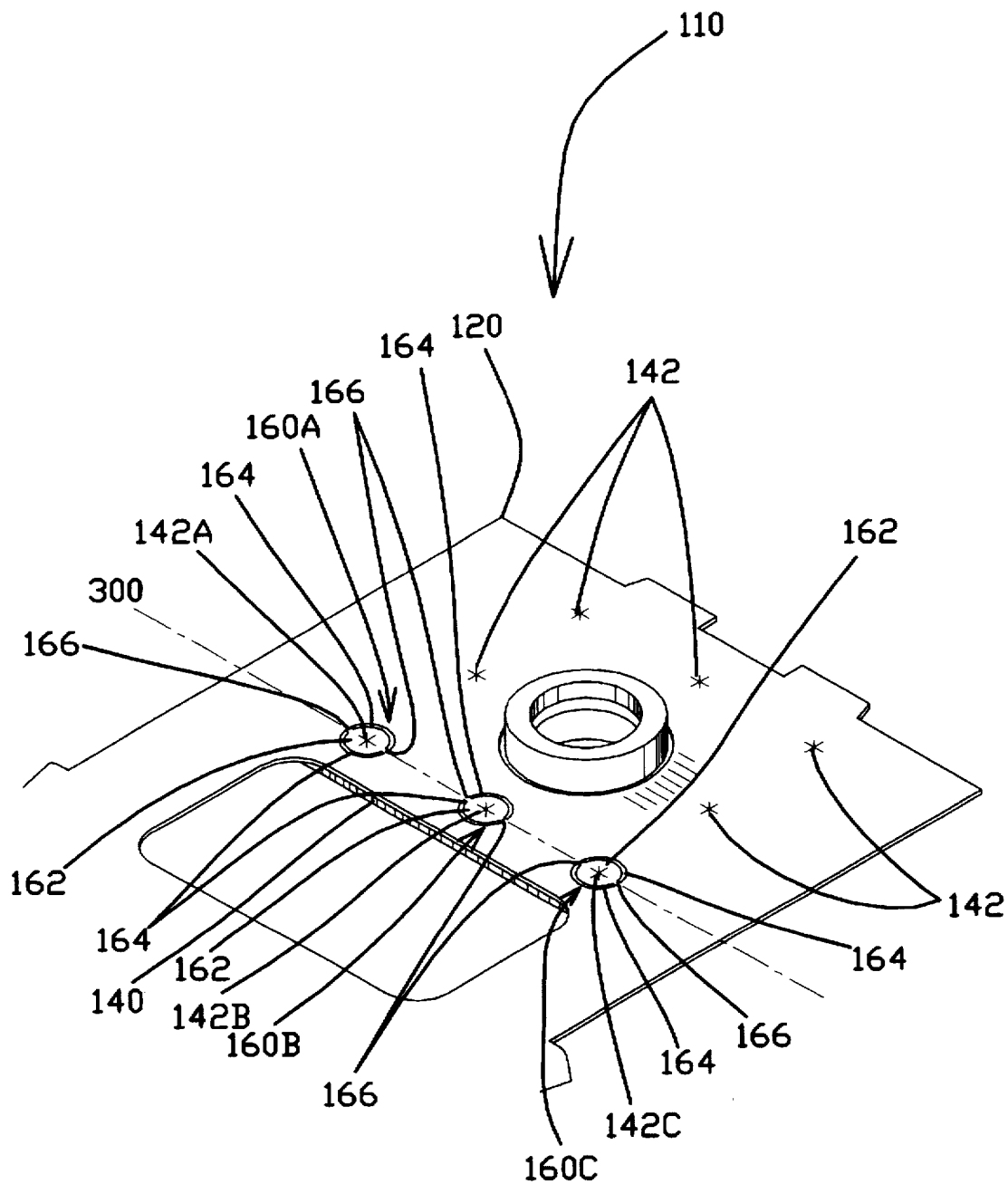
FIG. 4 is a detailed isometric view of a proximal end of the suspension assembly shown in FIG. 1, including a first embodiment of welding stress isolation structures in accordance with the present invention.

FIG. 4 is a detailed isometric view of a proximal end of the suspension assembly 110 illustrated in FIG. 1. Eight weld points 142A, 142B, 142C and 142 on the suspension assembly secure or couple the load beam 120 to a base plate 140. Selected weld points 142A–142C are isolated by welding stress isolation structures 160A–160C, similar to isolation structures 150A–150D.

Each isolation structure 160A–160C includes a welding area 162, generally a flat portion of the surface of the load beam 120. Each welding area 162 has a perimeter delineated and defined by isolation slots 164. Isolation slots 164 are through apertures or holes and are generally shaped as circumferential arc segments. Isolation structures 160A–160C each include two slots 164, each slot shaped generally as a semicircle. Two junction tabs 166 respectively, separate the respective two slots 164 from each other, support each welding area 162, and connect each welding area 162 to the rest of the load beam 120. Junction tabs 166 are each positioned at opposite ends of the respective welding area 162. The junction tabs 166 of all three isolation structures 160A–160C are aligned along a propagation axis 300 parallel to the pitch axis of the suspension assembly 110. The alignment of tabs 166 allows welding stresses to uniformly propagate along the entire width of the suspension assembly 110 along the propagation axis 300, substantially eliminating the influence of base plate welding stresses in the pitch direction.

Figure 5:
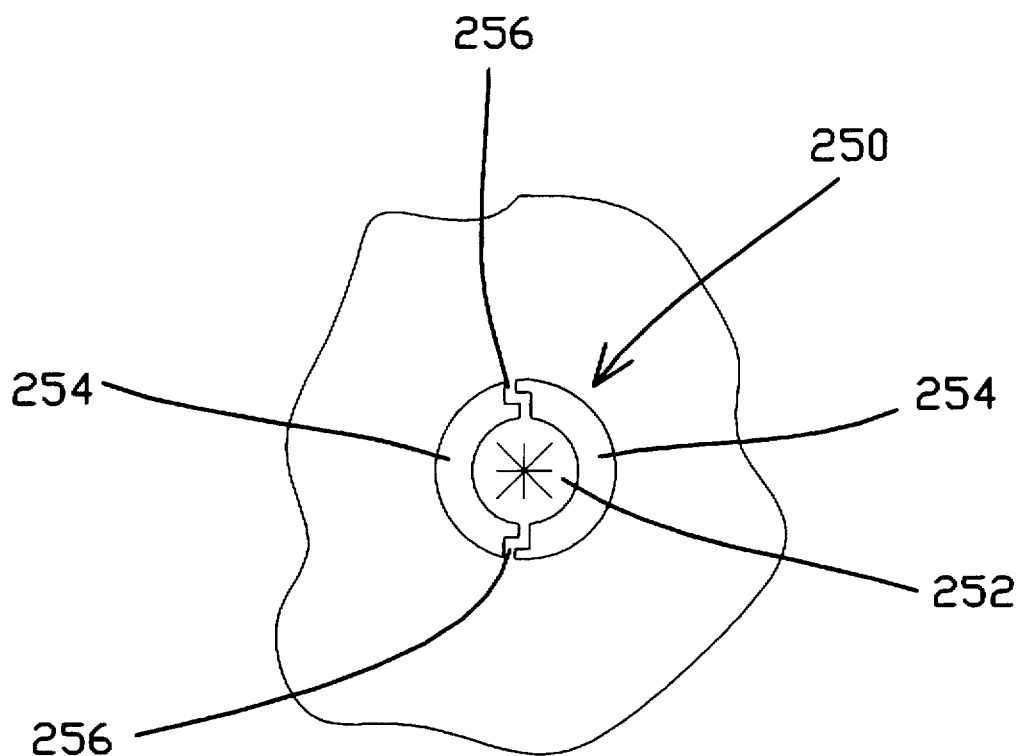
FIG. 5 is a detailed plan view of a second embodiment of a welding stress isolation structure in accordance with the present invention.

FIG. 5 is an enlarged detail plan view of a second embodiment of an isolation structure 250 in accordance with the present invention. Elements in this and other embodiments similar to those elements of the first isolation structure 150 are labelled with the same two last digits. Isolation structure 250 includes a welding area 252, two isolation slots 254 encircling welding area 252, and two junction tabs 256. The two junction tabs 256 are aligned at oppositely aligned ends of the welding area 252.

To reduce propagation of remaining welding stresses through the junction tabs, some embodiments of the isolation structure include irregularly shaped junction tabs. In isolation structure 250, each tab 256 is generally S-shaped or Z-shaped. That is, each junction tab 256 includes two connecting sharp radial break curves in opposite directions. Because welding stresses tend to propagate in straight lines, the two sharp radial curves mitigate the propagation of welding stresses across tab 256.

Figure 6:
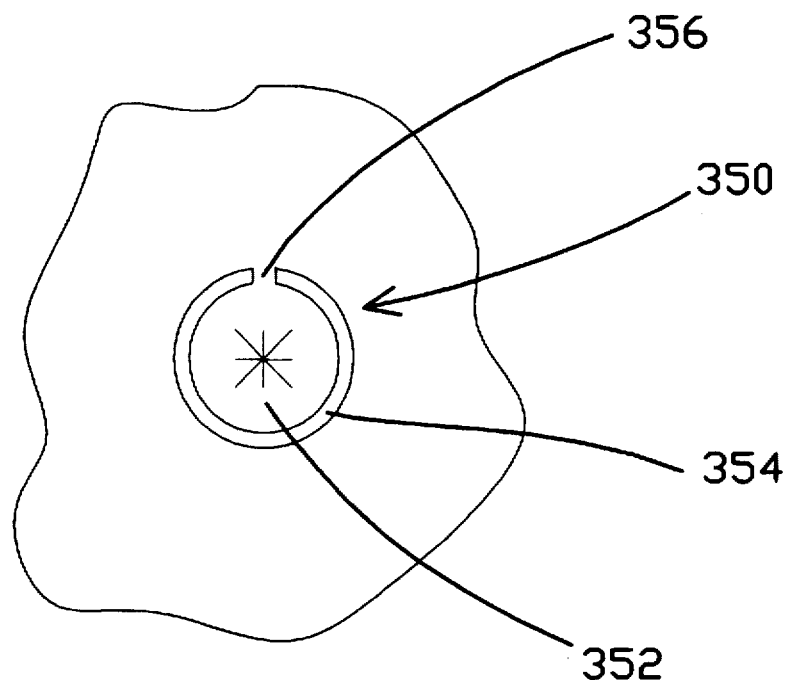
FIG. 6 is a detailed plan view of a third embodiment of a welding stress isolation structure in accordance with the present invention.

FIG. 6 is an enlarged plan view of a third embodiment of an isolation structure 350. Isolation structure 350 has one generally circumferential slot 354, delineating a circular welding area 352. One tab 356 bridges the slot 354 and connects and supports the welding area 352. Circular slot 354 mitigates expansion and contraction forces in almost all directions. Any remaining welding stresses can propagate in only one direction.

Figure 7:
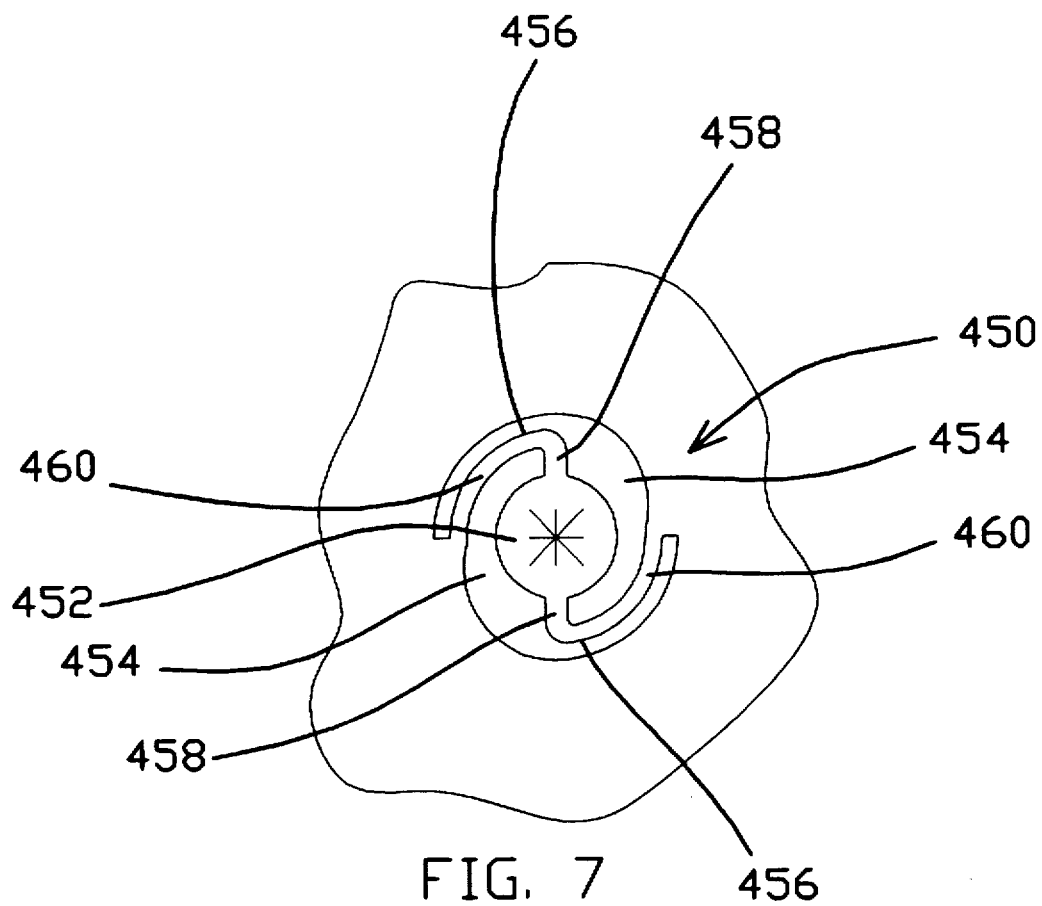
FIG. 7 is a detailed plan view of a fourth embodiment of a welding stress isolation structure in accordance with the present invention.

FIG. 7 is an enlarged plan view of a fourth embodiment of an isolation structure 450 in accordance with the present invention. Isolation structure 450 includes two isolation slots 454 and two junction tabs 456. Each junction tab 456 includes a first segment 458 connected to a welding area 452 and extending generally in a straight line radially away from the welding area 452 and a second segment 460 connected to the first segment 458 and to the remaining portion of a suspension assembly element. The second segment 460 is shaped as a generally planar elliptical curve having approximately a 180 degree radial break. Like the sharp radial curves of the embodiment of FIG. 5, the curved second segment 460 absorbs and mitigates welding stresses.

Figure 8:
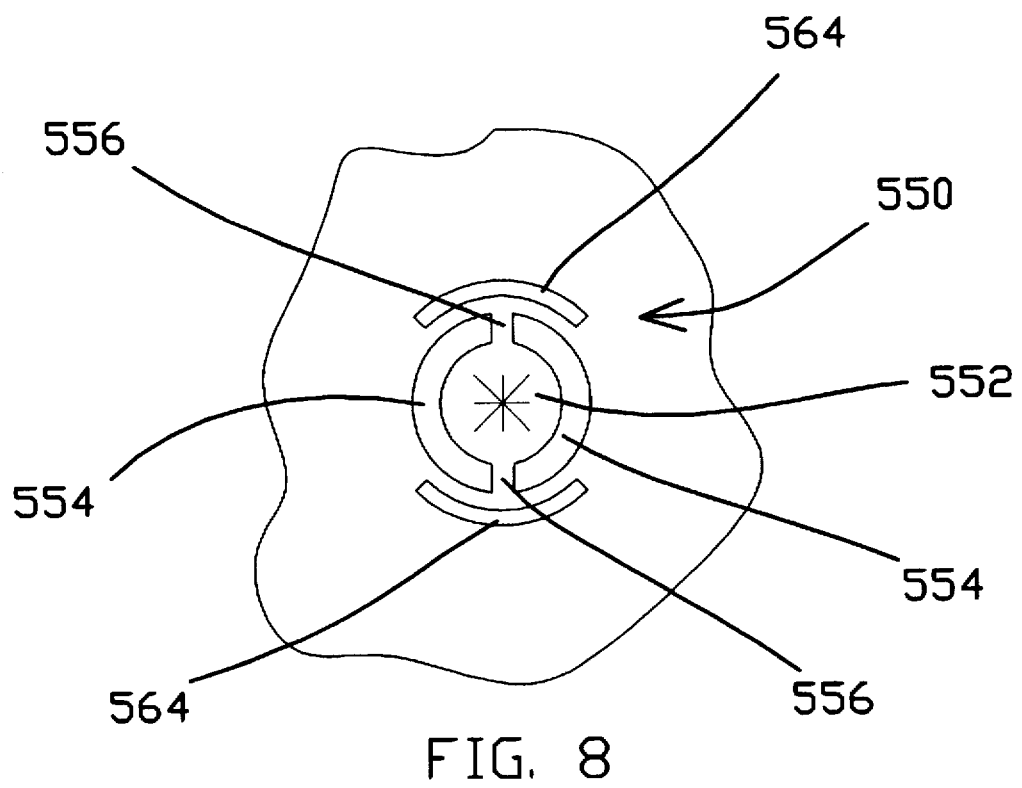
FIG. 8 is a detailed plan view of a fifth embodiment of a welding stress isolation structure in accordance with the present invention.

FIG. 8 shows an enlarged plan view of a fifth embodiment of an isolation structure 550. Isolation structure 550 resembles isolation structure 150A of FIG. 2, having a generally planar welding area 552, two circumferential slots 554, and two junction tabs 556 located at oppositely aligned ends of the welding area 552 and separating the two circumferential slots 554. However, isolation structure 550 further includes two additional arc-shaped slots 564, each located outside the periphery of slots 554 and adjacent and generally opposite the junction tab 556 from the welding area 552. The slots 564 are radially spaced from the welding area 552 and define a portion of a circumference concentric with and larger than the circumference defined by slots 554. The additional slots 564 provide additional isolation to help diffuse any remaining welding stresses transmitted through tabs 556.

Figure 9:
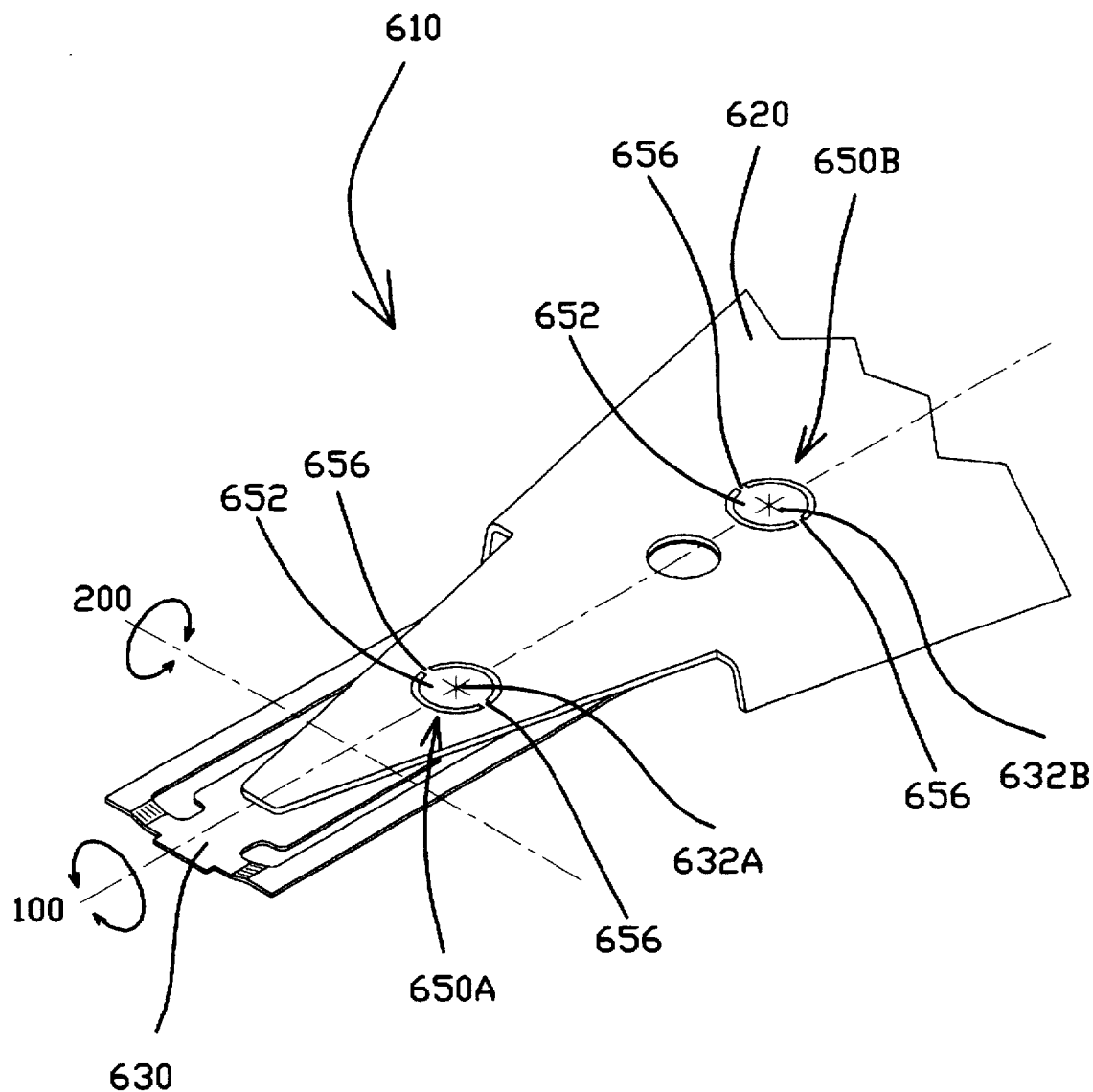
FIG. 9 is a detailed isometric top view of a distal end of a suspension assembly having welding stress isolation features in accordance with the present invention located in an arrangement primarily expected to reduce pitch variation.

A distal end of a suspension assembly 610 having two weld points 632A and 632B placed respectively within welding stress isolation features 650A and 650B in accordance with the present invention is illustrated in FIG. 9. Suspension assembly 610 includes a load beam 620 attached to a gimbal flexure 630 by the two weld points 632A and 632B.

The stress isolation features 650A and 650B are located along a roll axis 100 and each has a welding area 652 supported by two tabs 656 aligned opposite each other and in parallel with a pitch axis 200. The orientation of the tabs 656 directs remaining welding stresses symmetrically along the width of the load beam 620 and perpendicularly away from the roll axis 100. The location and orientation of the two stress isolation features 650A and 650B is primarily expected to reduce pitch variation.

Suspension assemblies including isolation structures in accordance with the present invention have significant advantages over those suspension assemblies bonded or fixed together solely by conventional weld points. Isolation structures, such as 150A, can be used to isolate weld points bonding a variety of suspension arm elements. For example, the load beam can be welded directly to an actuator arm or to an actuator. By relieving welding stresses, and by allowing for isolation structure orientation and placement to distribute any remaining welding stresses, the present invention substantially eliminates pitch and roll errors caused during welding of suspension assembly elements. More accurate control of the attitude of HSAs translate to more reliable and accurate disk drives.

Although the present invention has been described with reference to preferred embodiments, those skilled in the art will recognize that changes may be made in form and detail without departing from the spirit and scope of the invention.

What is claimed is:

1. In a suspension assembly for a disk drive, said suspension assembly having a load beam, wherein the load beam is to be welded to a suspension arm element by at least one weld point, the improvement comprising welding stress isolation structures for isolating at least one of the weld points and for reducing welding stresses as the load beam is welded to the suspension arm element, the welding isolation structure including:

a welding area positioned on a selected location on the load beam, wherein the weld point is located within the welding area;

at least one isolation slot positioned between perimeter edges of the load beam, the isolation slot including a through aperture delineating at least a portion of the perimeter of the welding area; and at least one junction tab supporting the welding area and connecting the welding area to a remainder of the load beam opposite the isolation slot from the welding area.

2. The invention of claim 1, wherein the welding area is generally circular and the slots are shaped as generally circumferential arc segments.

3. The invention of claim 1, wherein at least one junction tab is generally aligned with a pitch axis of the load beam.

4. The invention of claim 1, wherein at least one junction tab is generally aligned with a roll axis of the load beam.

5. The invention of claim 1, the isolation structure having a generally circular welding area delineated by two generally semicircular isolation slots, the slots separated by two junction tabs connecting oppositely aligned ends of the welding area to the remainder of the load beam.

6. The invention of claim 5, wherein the junction tabs are generally aligned with a pitch axis of the load beam.

7. The invention of claim 5, wherein the junction tabs are generally aligned with a roll axis of the load beam.

8. The invention of claim 1, wherein the junction tabs each include two connecting sharp radial break curves in opposite directions.

9. The invention of claim 1, wherein the junction tabs each include a first segment connected to the welding area and extending radially away from the welding area and a second segment connected to the first segment and the remainder of the load beam, the second segment shaped as a generally planar elliptical curve.

10. The invention of claim 1, further comprising at least one additional slot on the load beam, the additional slot located adjacent and generally opposite the junction tab from the welding area.

11. A welding isolation structure for creating an isolated weld point on a suspension assembly element for substantially eliminating undesirable propagation of welding stresses, the isolation structure comprising:

a welding area positioned on a selected location on the suspension assembly element, the welding area having a perimeter;

at least one isolation slot positioned between perimeter edges of the suspension assembly element the isolation slot including a through aperture delineating at least a portion of the perimeter of the welding area; and at least one junction tab supporting the welding area and connecting the welding area to a remainder of the suspension assembly element opposite the isolation slot from the welding area.

12. The isolation structure of claim 11, wherein the welding area is generally circular and the slots are shaped as generally circumferential arc segments.

13. The isolation structure of claim 11, wherein at least one junction tab is generally aligned with a pitch axis of the suspension assembly element.

14. The isolation structure of claim 11, wherein at least one junction tab is generally aligned with a roll axis of the suspension assembly element.

15. The isolation structure of claim 11, the isolation structure having a generally circular welding area delineated by two generally semicircular isolation slots, the slots separated by two junction tabs connecting oppositely aligned ends of the welding area to the remainder of the suspension assembly element.

16. The isolation structure of claim 15, wherein the junction tabs are generally aligned with a pitch axis of the suspension assembly element.

17. The isolation structure of claim 15, wherein the junction tabs are generally aligned with a roll axis of the suspension assembly element.

18. The isolation structure of claim 11, wherein the junction tabs each include two connecting equal sharp radial break curves in opposite directions.

19. The isolation structure of claim 11, wherein the junction tab includes a first segment connected to the welding area and extending radially away from the welding area and a second segment connected to the first segment and the remainder of the suspension assembly element, the second segment shaped as a generally planar elliptical curve.

20. The isolation structure of claim 11, further comprising at least one additional slot on the suspension assembly element adjacent and generally opposite the junction tab from the welding area.

21. A suspension assembly for placing a head assembly over the surface of a rotatable data storage device in a disk drive at predetermined roll and pitch angles, the roll angle measured in relation to a roll axis generally aligned with a longitudinal axis of the suspension assembly and the pitch angle measured in relation to a pitch axis perpendicular to the roll axis, the suspension assembly comprising:

a load beam including an elongated planar metal spring structure having a base plate region at a proximal end and a gimbal attachment region at a distal end; and a gimbal flexure for providing gimballing support to the head assembly, the gimbal flexure including a gimballing spring structure;

wherein the gimbal assembly is attached to the gimbal attachment region of the load beam by at least one weld point, wherein selected weld points on the load beam are isolated by welding stress isolation structures placed on selected locations on the load beam, each of the welding stress isolation structures having a generally flat welding area having a perimeter, wherein the weld point is within the welding area, at least one isolation slot positioned between perimeter edges of the load beam and in close proximity to the weld point, each slot including a through aperture, and at least one junction tab supporting the welding area and connecting the welding area to a remaining portion of the load beam opposite the isolation slot from the welding area.

22. The suspension assembly of claim 21, wherein the welding area of each isolation structure on the load beam is generally circular and each isolation slot is shaped as a generally circumferential arc segment.

23. The suspension assembly of claim 21, wherein selected weld points on the gimbal flexure are isolated by welding stress isolation structures placed on selected locations on the gimbal flexure, the welding stress isolation structure having a generally flat welding area having a perimeter, at least one isolation slot delineating the perimeter of the welding area, and at least one junction tab supporting the welding area and connecting the welding area to a remaining portion of the gimbal flexure opposite the isolation slot from the welding area.

24. The suspension assembly of claim 23, wherein the welding area of the isolation structures on the gimbal flexure is generally circular and the gimbal isolation slot is shaped as a generally circumferential arc segment.

25. The suspension assembly of claim 21, wherein the gimbal assembly is attached to the gimbal attachment region by two weld points, each weld point located on a welding area of a first and a second isolation structure respectively, each isolation structure having two junction tabs at oppositely aligned ends of the welding area, wherein the first and the second isolation structure are placed on the roll axis and have their respective junction tabs aligned with the pitch axis.

26. The suspension assembly of claim 21, wherein the gimbal assembly is attached to the gimbal attachment region by four weld points, each weld point located on a welding area of a first, a second, a third, and a fourth isolation structure respectively, each isolation structure having two junction tabs at oppositely aligned ends of the welding area, wherein the first and the second isolation structure are placed on the roll axis and have their respective junction tabs aligned with the pitch axis, and the third and the fourth isolation structure are placed in between the first and second isolation structure and are adjacent to each other on opposite sides of the roll axis, wherein the third and fourth isolation structures have their respective junction tabs aligned with the roll axis.

27. The suspension assembly of claim 21, wherein the gimbal assembly is attached to the gimbal attachment region by a plurality of weld points isolated by isolation structures, each isolation structure having at least one junction tab, wherein the junction tabs of each isolation structure are oriented generally in directions other than towards other weld points, such that additive and uneven propagation of welding stresses is prevented.

28. The suspension assembly of claim 21, further comprising a base plate, the base plate including a metal plate generally congruent to the base plate region of the load beam, the base plate attached to the base plate region of the load beam by at least one weld point isolated by a welding stress isolation structure, each stress isolation structure having a welding area having a perimeter, an isolation slot delineating the perimeter of the welding area, and at least one junction tab supporting the welding area and connecting the welding area to the load beam across the isolation slot.

29. The suspension assembly of claim 28, wherein the welding area of each isolation structure is generally circular and the isolation slot is a generally circumferential arc.

30. The suspension assembly of claim 28, wherein each weld point includes two junction tabs located at oppositely aligned ends of the welding area, both junction tabs aligned with the pitch axis.

31. The suspension assembly of claim 28, wherein the base plate is attached to the load beam by at least three weld points isolated by isolation structures and aligned along a propagation axis parallel to the pitch axis, wherein each isolation structure has two junction tabs located at oppositely aligned ends of a welding area, the junction tabs aligned along the propagation axis.

32. A suspension assembly for placing a head assembly over the surface of a rotatable data storage device in a disk drive at predetermined roll and pitch angles, the roll angle measured in relation to a roll axis generally aligned with a longitudinal axis of the suspension assembly and the pitch angle measured in relation to a pitch axis perpendicular to the roll axis, the suspension assembly comprising:

a plurality of suspension assembly elements bonded together by a plurality of weld points;

wherein at least one of the weld points on at least one of the suspension assembly elements is isolated by a welding stress isolation structure, each of the welding stress isolation structures having a generally flat welding area, wherein the weld point is within the welding area, and at least one aperture through the suspension assembly element positioned between perimeter edges of the suspension assembly element and in close proximity to the weld point, the aperture for reducing the propagation of stresses from the weld point to a remaining portion of the suspension assembly element.

* * * * *